(12) United States Patent
Yin

(10) Patent No.: US 9,747,373 B2
(45) Date of Patent: Aug. 29, 2017

(54) INQUIRY METHOD AND SYSTEM, INQUIRY SEARCH SERVER AND INQUIRY TERMINAL

(75) Inventor: Junjie Yin, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 255 days.

(21) Appl. No.: 14/397,541

(22) PCT Filed: May 11, 2012

(86) PCT No.: PCT/CN2012/075409
§ 371 (c)(1),
(2), (4) Date: Oct. 28, 2014

(87) PCT Pub. No.: WO2013/166730
PCT Pub. Date: Nov. 14, 2013

(65) Prior Publication Data
US 2015/0134649 A1    May 14, 2015

(51) Int. Cl.
G06F 17/30 (2006.01)
H04W 8/00 (2009.01)
H04W 4/02 (2009.01)

(52) U.S. Cl.
CPC .... *G06F 17/30867* (2013.01); *G06F 17/3053* (2013.01); *G06F 17/30964* (2013.01); *H04W 4/023* (2013.01); *H04W 8/005* (2013.01)

(58) Field of Classification Search
USPC .................................................. 707/706, 723
See application file for complete search history.

(56) References Cited

U.S. PATENT DOCUMENTS

| | | | | |
|---|---|---|---|---|
| 8,341,024 B2* | 12/2012 | Bantz | ................... | G06Q 30/016 705/26.1 |
| 8,831,634 B2* | 9/2014 | Wang | ..................... | H04W 4/02 455/404.1 |

(Continued)

FOREIGN PATENT DOCUMENTS

| | | |
|---|---|---|
| CN | 1918834 A | 2/2007 |
| CN | 101778360 A | 7/2010 |
| CN | 102246164 A | 11/2011 |

OTHER PUBLICATIONS

Supplementary European Search Report in European application No. 12876537.7, mailed on May 13, 2015.

(Continued)

*Primary Examiner* — Kim Nguyen
(74) *Attorney, Agent, or Firm* — Oppedahl Patent Law Firm LLC

(57) ABSTRACT

The disclosure relates to the communication field and disclosures an inquiry method, an inquiry system, an inquiry search server and an inquiry terminal. The method includes that: after receiving an inquiry request from an inquiry terminal, an inquiry search server acquires a keyword related to the inquiry request, determines a given number of other inquiry terminals as a target inquiry terminal group according to the keyword and relevant information of the other inquiry terminals, and sends the inquiry request to each target inquiry terminal in the target inquiry terminal group. The disclosure enables the users of inquiry terminals to inquiry of each other about a question and to obtain a corresponding answer, which undoubtedly facilitates the operation of the users and contributes to promoting the technical solution of the disclosure, moreover, the disclosure truly pools the wisdom of the masses to achieve an excellent inquiry-and-answer effect.

21 Claims, 2 Drawing Sheets

(56) References Cited

U.S. PATENT DOCUMENTS

| | | | |
|---|---|---|---|
| 9,002,837 B2* | 4/2015 | Brandstetter | G06F 17/30867 |
| | | | 707/723 |
| 2005/0050025 A1 | 3/2005 | Kurata | |
| 2005/0050034 A1* | 3/2005 | Kamiyama | H04M 1/72583 |
| 2007/0162935 A1 | 7/2007 | Matsutani | |
| 2008/0022211 A1 | 1/2008 | Jones | |
| 2009/0006388 A1 | 1/2009 | Ives | |
| 2009/0068992 A1* | 3/2009 | Takehara | H04W 4/02 |
| | | | 455/412.1 |
| 2011/0246496 A1 | 10/2011 | Chung | |
| 2011/0302033 A1* | 12/2011 | Lee | G06Q 30/02 |
| | | | 705/14.57 |
| 2011/0307478 A1 | 12/2011 | Pinckney | |
| 2011/0307496 A1 | 12/2011 | Jones | |
| 2012/0089974 A1* | 4/2012 | Cho | G06F 8/61 |
| | | | 717/173 |
| 2012/0096089 A1 | 4/2012 | Barash | |
| 2012/0108218 A1* | 5/2012 | Kho | H04L 67/306 |
| | | | 455/414.1 |
| 2013/0071831 A1 | 3/2013 | Jones | |

OTHER PUBLICATIONS

International Search Report in international application No. PCT/CN2012/075409, mailed on Feb. 7, 2013.

English Translation of the Written Opinion of the International Search Authority in international application No. PCT/CN2012/075409, mailed on Feb. 7, 2013.

* cited by examiner

INQUIRY METHOD AND SYSTEM, INQUIRY SEARCH SERVER AND INQUIRY TERMINAL

TECHNICAL FIELD

The disclosure relates to an inquiry technology and more particularly to an inquiry method, an inquiry system, an inquiry search server and an inquiry terminal.

BACKGROUND

With people communicating with each other more and more frequently, how to acquire desirable information more conveniently remains, as ever, an important research subject in information technology. The search technologies provided by companies like Google and Baidu realize the share of computer data resources and therefore remarkably expand the sources for the acquisition of information. Nonetheless, there are still a great amount of information and wisdom resources which are 'hidden' in people's brain but not input in a computer database. People generally get such information and wisdom by inquiring of people nearby about the information and wisdom, resulting in a low efficiency.

Meanwhile, voice communication technologies, although developed very early, are mainly applied to end-to-end real-time communication or real-time communication between limited groups known to each other, which is inconvenient for people to acquire information and wisdom resources from a wider social range.

Thus, it is needed a new inquiry communication technology by means of which an inquiry can be searched conveniently to acquire the information and wisdom resources 'hidden' in people's brain. Unfortunately, no related researches have been done in this field.

SUMMARY

The disclosure provides an inquiry method, an inquiry system, an inquiry search server and an inquiry terminal for users to inquire of each other about a question and acquire a corresponding answer.

The specific technical solutions of the disclosure are as follows.

An inquiry method includes the following steps that:

after receiving an inquiry request from an inquiry terminal, an inquiry search server acquires a keyword related to the inquiry request, determines a given number of other inquiry terminals as a target inquiry terminal group according to the keyword and relevant information of the other inquiry terminals, and sends the inquiry request to each target inquiry terminal in the target inquiry terminal group.

The method further may include that:

after receiving an answer to the inquiry from a target inquiry terminal, the inquiry search server sends the answer to the inquiry terminal.

The method further may include that:

relevant information of the inquiry terminal is all stored in the inquiry search server, wherein the relevant information of the inquiry terminal includes at least one of: the personal information of the user of the inquiry terminal and the information updated by the inquiry terminal in real time, wherein the personal information of the user of the inquiry terminal includes at least one of: the name, the gender, the age, the ID card number, the home address, the skilled field, the demand, and the wish of each family member of the user of the inquiry terminal, and the information updated by the inquiry terminal in real time includes at least one of: geographical location information, the number of the target inquiry terminals required by the inquiry terminal to be included in the target inquiry terminal group, the number of the answers desired by the inquiry terminal, the idle/busy state of the receiving cache of the inquiry terminal and the points gotten by the inquiry terminal as a target inquiry terminal.

In the method, acquiring a keyword related to the inquiry request may be as follows:

when initiating the inquiry request, the inquiry terminal notifies the inquiry search server of the keyword of the inquiry request;

or the inquiry search server analyzes the keyword of the inquiry request from the content of the inquiry request received.

In the method, determining a given number of other inquiry terminals as a target inquiry terminal group according to the keyword and relevant information of the other inquiry terminals may refer to:

matching the keyword with relevant information of the other inquiry terminals, preferentially with relevant information of an idle inquiry terminal and/or an inquiry terminal getting more points, and determining the final target inquiry terminal group based on the number of the target inquiry terminals required by the inquiry terminal; and when there is no inquiry terminal matching with the keyword or the number of the target inquiry terminal fails to meet the requirement of the inquiry terminal, preferentially adding the inquiry terminal close to the home address or the current location of the user of the inquiry terminal into the target inquiry terminal group;

alternatively, when there is no inquiry terminal matching with the keyword or the number of the target inquiry terminal fails to meet the requirement of the inquiry terminal, preferentially adding the inquiry terminal getting more points in the target inquiry terminal group.

The method further may include that:

the inquiry search server assigns identification information to each inquiry terminal and sends the received inquiry request to each target inquiry terminal in the target inquiry terminal group according to the identification information of the inquiry terminal.

The method further may include that:

the number of the answers to the inquiry received by the inquiry search server and sent from the inquiry search server to the inquiry terminal is not higher than that desired by the inquiry terminal.

The method further may include that:

the inquiry search server also receives the evaluation given by the inquiry terminal on an answer and updates the points of the target inquiry terminal giving the answer according to the scores of the evaluation.

In the method, the inquiry request may include a voice inquiry request, a video inquiry request and a text inquiry request; and The answer to the inquiry request may include a voice answer, a video answer and a text answer.

An inquiry search server includes a receiving unit, an acquisition unit, a determination unit and a sending unit, wherein the receiving unit is configured to receive an inquiry request of an inquiry terminal;

the acquisition unit is configured to acquire the keyword of the inquiry request;

the determination unit is configured to determine a given number of other inquiry terminals as a target inquiry terminal group according to the keyword and relevant information of the other inquiry terminals; and the sending unit is configured to send the inquiry request to each target inquiry terminal in the target inquiry terminal group.

The inquiry search server further may include:

a storage unit configured to store relevant information of each inquiry terminal, wherein the relevant information of each inquiry terminal includes at least one of: the personal information of the user of the inquiry terminal and the information updated by the inquiry terminal in real time, wherein the personal information of the user of the inquiry terminal includes at least one of: the name, the gender, the age, the ID card number, the home address, the skilled field, the demand, and the wish of each family member of the user of the inquiry terminal, and the information updated by the inquiry terminal in real time includes at least one of: geographical location information, the number of the inquiry terminals required by the inquiry terminal to be included in the target inquiry terminal group, the number of the answers desired by the inquiry terminal, the idle/busy state of the receiving cache of the inquiry terminal and the points gotten by the inquiry terminal as a target inquiry terminal.

When the inquiry terminal initiates an inquiry request, the receiving unit receives a notification indicative of the keyword of the inquiry request; and the acquisition unit acquires the keyword of the inquiry request from the receiving unit.

Alternatively, the acquisition unit analyzes the keyword of the inquiry request from the content of the inquiry request.

The determination unit may be also configured to match the keyword with relevant information of each inquiry terminal, preferentially with relevant information of an idle inquiry terminal and/or an inquiry terminal getting more points, and determine a final target inquiry terminal group based on the number of the target inquiry terminals required by the inquiry terminal.

When there is no inquiry terminal matching with the keyword or the number of the target inquiry terminals fails to meet the requirement of the inquiry terminal, the inquiry terminal close to the home address or the current location of the user of the inquiry terminal or the inquiry terminal getting more points is preferentially added into the target inquiry terminal group.

An inquiry terminal may include a generation unit, a sending unit and a receiving unit, wherein the generation unit is configured to generate an inquiry request;

the sending unit is configured to send the inquiry request to an inquiry search server; and the receiving unit is configured to receive an answer to the inquiry request forwarded by the inquiry search server.

The inquiry terminal further may include a storage unit configured to store an answer, wherein the sending unit is also configured to notify the idle/busy state of the storage unit to the inquiry search server.

An inquiry system includes the foregoing inquiry search server and the foregoing inquiry terminal.

In the disclosure, after receiving an inquiry request from an inquiry terminal, an inquiry search server acquires a keyword related to the inquiry request, determines a given number of other inquiry terminals potentially capable of providing an answer to the inquiry as a target inquiry terminal group according to the keyword and relevant information of the other inquiry terminals, and sends the inquiry request to each target inquiry terminal in the target inquiry terminal group. The disclosure enables the users of inquiry terminals to inquiry of each other about a question and to obtain a corresponding answer, which undoubtedly facilitates the operation of the users and contributes to promoting the technical solution of the disclosure, moreover, the disclosure truly pools the wisdom of the masses to achieve an excellent inquiry-and-answer effect.

DETAILED DESCRIPTION

Embodiments of the disclosure are described below in detail with reference to accompanying drawings.

Figure 1:
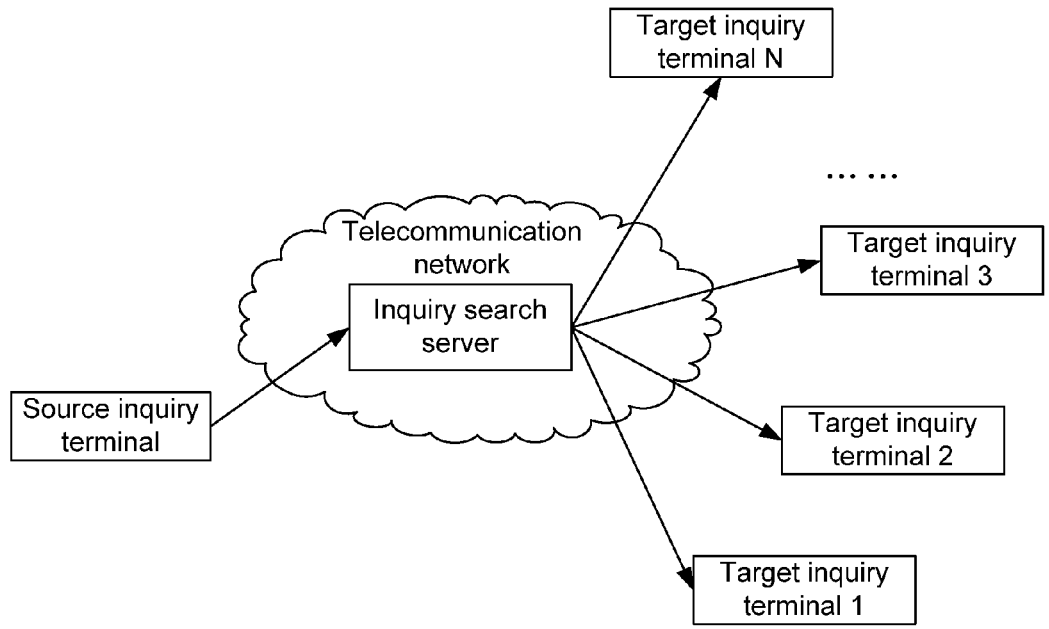
FIG. 1 is a schematic diagram illustrating the structure of an inquiry system according to an embodiment of the disclosure.

FIG. 1 is a schematic diagram illustrating the structure of an inquiry system according to an embodiment of the disclosure, and as shown in FIG. 1, the inquiry system provided in the disclosure includes an inquiry search server and an inquiry terminal and a target inquiry terminal connected with the inquiry search server. The inquiry terminal is a terminal initiating an inquiry request, and the target inquiry terminal is the inquiry terminal selected to answer the inquiry request initiated by the inquiry terminal. In the inquiry system provided herein, each inquiry terminal can initiate an inquiry request or answer an inquiry request initiated by another inquiry terminal as a target inquiry terminal.

The inquiry search server takes charge of maintaining and collating relevant information of all inquiry terminals. Relevant information of the user of the inquiry terminal is all stored in the inquiry search server, wherein the relevant information of the inquiry terminal includes at least one of:

the personal information of the user of the inquiry terminal and the information updated by the inquiry terminal in real time, wherein the personal information of the user of the inquiry terminal includes at least one of:

the name, the gender, the age, the ID card number, the home address, the skilled field, the demand, and the wish of each family member of the user of the inquiry terminal, and the information updated by the inquiry terminal in real time includes at least one of:

geographical location information, the number of the target inquiry terminals required by the inquiry terminal to be included in a target inquiry terminal group, the number of the answers desired by the inquiry terminal, the idle/busy state of the receiving cache of the inquiry terminal and the points gotten by the inquiry terminal as a target inquiry terminal.

With the exception of the information updated by the inquiry terminal in real time, the other information, such as the personal information of the user of the inquiry terminal including the name, the gender, the age, the address and the skilled field of the user of the inquiry terminal, is usually relatively stable; the user of the inquiry terminal can register or modify the other information on the inquiry search server online or register the other information on the site or by making a long-distance call, in the latter case, the other information is input in the inquiry search server by the operating company for registration or modification, and the authenticity and the security of the other information are guaranteed by the operating company. Meanwhile, the inquiry search server assigns an inquiry terminal ID to each inquiry terminal, wherein the ID is the address of an inquiry terminal interacting with the inquiry search server.

The inquiry search server also takes charge of maintaining information of low stability of the user of the inquiry terminal, for example, recent problems, demands and wishes of the user of the inquiry terminal and the family members of the user of the inquiry terminal, such information is edited or modified by the user of the inquiry terminal on the inquiry search server online or registered by the user of the inquiry terminal on the site or by making a long-distance call and input in the inquiry search server by the operating company for edition or modification or directly edited or modified by the user of the inquiry terminal on an interface provided by the inquiry terminal.

The inquiry search server also takes charge of receiving and maintaining some instant information, including the keyword of the inquiry request currently initiated by the inquiry terminal, the current geographical location of the inquiry terminal and the empty/occupied state of the inquiry receiving cache of the inquiry terminal; these pieces of information are edited by the source inquiry terminal on an interface provided by the inquiry terminal and sent to the inquiry search server, or automatically acquired by the inquiry terminal and automatically updated in the inquiry search server.

Further, the inquiry search server still takes charge of maintaining some other instant information, including the service evaluation points gotten by each inquiry terminal, a source inquiry search information broadcast table (including IDs of all target inquiry terminals), a record table of the target inquiry terminals (IDs of all the target inquiry terminals answering to a corresponding inquiry search) answering the inquiry terminal, and the number of the inquiry information of the same inquiry terminal (for distinguishing between different inquiry information of the same inquiry terminal).

The ID and the inquiry number of the source inquiry terminal are contained in the inquiry request information of the source inquiry terminal received by the inquiry search server.

Once the inquiry search server receives from an inquiry terminal an inquiry and a keyword which is a key feature of the target inquiry terminal (an inquiry terminal user capable of answering the inquiry) the user of the source inquiry terminal desires to inquire of, the inquiry search server caches the inquiry request information sent from the source inquiry terminal while searching for relevant information of inquiry terminals matching with the keyword, wherein the relevant information of the inquiry terminals includes personal information of the users of the inquiry terminals and the information updated by the inquiry terminals in real time, and last, then, a preliminary target inquiry terminal group is obtained.

In the disclosure, the inquiry search server may obtain the instant geographical location information of an inquiry terminal by conducting an update operation continuously.

On the basis that the preliminary target inquiry terminal group is obtained, the inquiry search server selects a final target inquiry terminal to which a broadcast is forwarded to with reference to states of the target inquiry terminals, preferably, the inquiry search server selects an inquiry terminal the receiving cache of which is empty or an inquiry terminal getting more points or an inquiry terminal closer in geographical location to the source inquiry terminal as the target inquiry terminal. By implementing these strategies, the inquiry search server obtains a table of the final to-be-broadcasted target inquiry terminals desired by the source inquiry terminal, the set of the IDs of the target inquiry terminals is presented in the target inquiry terminal table, and the inquiry search server broadcasts the inquiry request of the source inquiry terminal out according to the broadcast table. If there is no target inquiry terminal matching with the keyword of the inquiry terminal, the inquiry search server directly searches for a target inquiry terminal close in geographical location to the source inquiry terminal to broadcast the inquiry request to the target inquiry terminal, and the ID and the inquiry number of the source inquiry terminal are contained in the broadcasted inquiry request information. Here, being close in geographical location to the source inquiry terminal means being close to the home address and/or the current location of the user of the inquiry terminal, and it may be set here that a distance within a distance of 100 m or 500 m is a close distance.

In the disclosure, the inquiry request includes, but is not limited to: voice inquiry request, video inquiry request, text inquiry request and the like, and correspondingly, the answer to the inquiry request includes, but is not limited to: voice answer, video answer, text answer and the like. As to a voice inquiry request, the user of the inquiry terminal can record a voice inquiry in real time using the voice recording function of the inquiry terminal and send the recorded voice to the inquiry search server; and as to a video inquiry request, the user of the inquiry terminal can make a video inquiry in real time using the video recording function of the inquiry terminal and send the recorded video to the inquiry search server. As to the answer to an inquiry, the other inquiry terminals may give an answer to the inquiry request of the inquiry terminal by voice or video recording.

It should be noted that the inquiry search server itself has a voice recognition function, if the user of the source inquiry terminal initiates an inquiry request in a voice or video manner instead of inputting a keyword, then the voice inquiry search server automatically recognizes information of the voice inquiry or video inquiry of the user of the source inquiry terminal and extracts a keyword for searching for a target inquiry terminal.

The inquiry search server may analyze a keyword from relevant information of the inquiry terminal.

The ID and the inquiry number of the source inquiry terminal are contained in the answer of the target inquiry terminal received by the inquiry search server, the inquiry search server forwards the answer to the source inquiry terminal according to the ID of the source inquiry terminal contained in the answer, and the inquiry number of the source inquiry terminal is also added in the answer.

The inquiry search server statistically records answers of the target inquiry terminals, the record is stored in a record table of inquiry answering terminals (that is, target inquiry terminals); once the number of the answers given by the target inquiry terminals to the inquiry request of the corresponding source inquiry terminal reaches a desirable number applied for by the user of the inquiry terminal, the inquiry search server considers that the current inquiry search service for the source inquiry terminal is completed, then shields subsequent answers to the inquiry of the source inquiry terminal and supports the notification of the acquisition of a desired answer to the other target inquiry terminals having not given no answer to a corresponding inquiry request of the source inquiry terminal.

The inquiry search server stores the malicious answers reported by the user of the inquiry terminal for later evidence presentation, meanwhile, the inquiry search server supports the shielding of the logic connection path of a malicious inquiry terminal user.

The inquiry search server uniformly accumulates the points of each target inquiry terminal according to the evaluation scores given by the source inquiry terminal, the points are beneficial for the operating company to the make an operation strategy and develop corresponding rewards and punishment measures.

The inquiry search server records different types of services initiated by the inquiry terminal, for example, a reward-offered service initiated by the user of the inquiry terminal, to help the operating company make an operation strategy later, thus making it easy for the operating company to supervise and prove the fulfilling of the reward offering to the user of the inquiry terminal.

The inquiry search server also accepts a broadcast service initiated by the user of the inquiry terminal aiming at a self-defined group, this broadcast is forwarded according to a group inquiry terminal ID designated by the user of the source inquiry terminal.

The inquiry search server sends prompt information to the source inquiry terminal if the source inquiry terminal is not answered for a long time, so as to suggest the source inquiry terminal to modify the keyword.

The inquiry terminal provided herein has the following technical features:

the inquiry terminal provided herein which may be any existing inquiry terminal device, for example, a telephone, a mobile telephone, a computer or a new inquiry terminal product, supports all existing network access methods, including ordinary telephone network access, xDSL access, passive optical network access and various wireless network accesses, and each inquiry terminal has a unique inquiry terminal identification number (ID) assigned by the inquiry search server.

The inquiry terminal has an interface for editing text data via which the user of the inquiry terminal can send a data keyword to the inquiry search server and the personal information of the user of the inquiry terminal is modified, meanwhile, for the user of a mobile inquiry terminal, the inquiry terminal supports a function of automatically reporting the geographical location information of the inquiry terminal to the inquiry search server.

The inquiry terminal has a caching function to cache voice inquiry or video inquiry information thereof and the answer information received from a target inquiry terminal and cache when serving as a source inquiry terminal or the inquiry information received from the source inquiry terminal when serving as a target inquiry terminal; meanwhile, once the space occupied by the inquiry information received from the source inquiry terminal is beyond a quota in the receiving cache, the inquiry terminal automatically sends the 'full' state of the receiving cache to the inquiry search server to support the inquiry search server to develop a broadcast strategy.

The user of the inquiry terminal may initiate an inquiry request to the target inquiry terminals at any time through the inquiry terminal, the user of the inquiry terminal may input a keyword of the target inquiry terminal on the inquiry terminal and submits the keyword to the inquiry search server for the inquiry search server to find a target inquiry terminal group; the content of the inquiry request of the source terminal is recorded in a voice or video manner, and the voice of the user of the target inquiry terminal is converted to a voice signal and stored in the cache of the inquiry terminal; the inquiry terminal submits the inquiry request to the inquiry search server when the network is idle and adds its own ID in the inquiry request, meanwhile, the inquiry terminal supports the assignment of a number to the inquiry request information and the submission of the inquiry request to the inquiry search server along with the number.

When serving as a source inquiry terminal, the inquiry terminal has a voice or video coding and noiseless compression function, and correspondingly, when serving as a target inquiry terminal, the inquiry terminal has a voice or video decompression function for restoring the voice or video of the user of the inquiry terminal. Certainly, the inquiry request may be text information.

After the target inquiry terminal receives the inquiry request (voice or record here) of the source inquiry terminal forwarded by the inquiry search server, the user of the target inquiry terminal listens to the voice inquiry or watch the inquiry video of the source inquiry terminal, selectively initiates voice or video answering to the inquiry of the source inquiry terminal after confirming himself or herself is capable of answering the inquiry, submits the answer to the inquiry search server, wherein the ID and the inquiry number of the source inquiry terminal are added in the answer, and sends the answer to the source inquiry terminal via the inquiry search server, thereby obtaining desirable information. Certainly, the inquiry request may be text information.

Once the target inquiry terminals receive an inquiry request from the source inquiry terminal or receive answer information from target inquiry terminals, these target inquiry terminals will give different prompt sounds and indicate the receiving states of their respective answer information.

Initiating an inquiry request or answering a received inquiry request, the inquiry terminal may selectively attach its own ID in the inquiry request or in the answer, the selection signal is submitted to the inquiry search server at the same time and sent to the target inquiry terminal or the source inquiry terminal to shield the display of the ID of the inquiry terminal.

For an item indicating that the inquiry has been completed according to a notification received from the inquiry search server, the inquiry terminal is prompted that the corresponding item is invalid or prompted to directly delete the item to save the space of the cache.

If the user of the inquiry terminal considers the received answer information useless, the inquiry is then forwarded by the inquiry search server to acquire help from a wider range. For a question the target inquiry terminal is indeed incapable of providing an answer, the user of the source inquiry terminal may selectively delete or keep the inquiry request information on his/her inquiry terminal.

The user of the inquiry terminal may report a malicious answer to the inquiry search server and submit the malicious answer to the inquiry search server for latter proof presentation.

The user of the source inquiry terminal may mark the answer received from the target inquiry terminal on his/her inquiry terminal and submit the scores to the inquiry search server for point statistics.

The inquiry terminal may initiate different types of inquiry requests, the user of the inquiry terminal may initiate a reward-offered service for an emergent question needing a high-quality answer and post a reward amount which can be seen by the user of the target inquiry terminal.

The inquiry terminal provided herein also supports grouping the contacts stored in its address book, attaches a group inquiry terminal ID in an inquiry search when initiating the inquiry search and notifies the inquiry search server to broadcast the inquiry to the known group, thereby sending inquiry request information to the members in a group.

Figure 2:
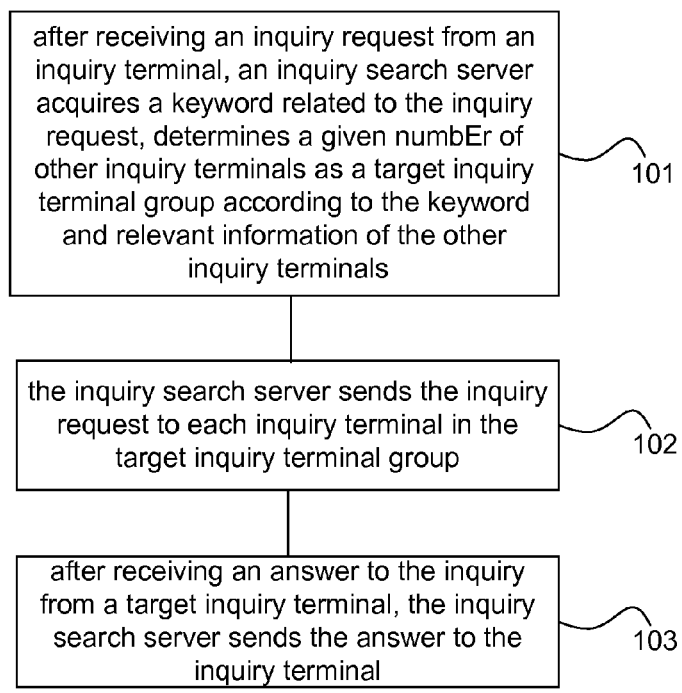
FIG. 2 is a flowchart illustrating an inquiry method according to an embodiment of the disclosure.

FIG. 2 is a flowchart illustrating an inquiry method according to an embodiment of the disclosure, and as shown in FIG. 2, the method includes the following steps.

Step 201: After receiving an inquiry request from an inquiry terminal, an inquiry search server acquires a keyword related to the inquiry request, determines a given number of other inquiry terminals as a target inquiry terminal group according to the keyword and relevant information of the other inquiry terminals;

the given number of other determined inquiry terminals are inquiry terminals potentially capable of answering the inquiry request of the user of the inquiry terminal;

the relevant information of the inquiry terminal which is all stored in the inquiry search server includes at least one of the personal information of the user of the inquiry terminal and the information updated by the inquiry terminal in real time; the personal information of the user of the inquiry terminal includes at least one of the name, the gender, the age, the ID card number, the home address, the skilled field, the demand, and the wish of each family member of the user of the inquiry terminal; and the information updated by the inquiry terminal in real time includes at least one of geographical location information, the number of the target inquiry terminals required by the inquiry terminal to be included in the target inquiry terminal group, the number of the answers desired by the inquiry terminal, the idle/busy state of the receiving cache of the inquiry terminal and the points gotten by the inquiry terminal as a target inquiry terminal.

Acquiring a keyword related to the inquiry request is as follows:

when initiating the inquiry request, the inquiry terminal notifies the inquiry search server of the keyword of the inquiry request;

or the inquiry search server analyzes the keyword of the inquiry request from the content of the inquiry request received.

Determining a given number of other inquiry terminals as a target inquiry terminal group according to the keyword and relevant information of the other inquiry terminals refers to:

matching the keyword with relevant information of the other inquiry terminals, preferentially with an idle inquiry terminal and/or an inquiry terminal getting more points, and determining the final target inquiry terminal group based on the number of the target inquiry terminals required by the inquiry terminal;

when there is no inquiry terminal matching with the keyword or the number of the target inquiry terminals fails to meet the requirement of the inquiry terminal, preferentially adding the inquiry terminal close to the home address or the current location of the user of the inquiry terminal into the target inquiry terminal group;

alternatively, when there is no inquiry terminal matching with the keyword or the number of the target inquiry terminals fails to meet the requirement of the inquiry terminal, preferentially adding an inquiry terminal getting more points into the target inquiry terminal group;

Step 202: The inquiry search server sends the inquiry request to each inquiry terminal in the target inquiry terminal group;

the inquiry search server assigns identification information to each inquiry terminal and sends the received inquiry request to each target inquiry terminal in the target inquiry terminal group according to the identification information of the inquiry terminal;

Step 203: After receiving an answer to the inquiry from a target inquiry terminal, the inquiry search server sends the answer to the inquiry terminal.

Here, the inquiry request is a voice or video inquiry request or a text inquiry request, and the answer to the inquiry request may be a voice or video answer or a text answer.

In the disclosure, the number of the answers to an inquiry received by the inquiry search server and sent from the inquiry search server to the inquiry terminal is not higher than that desired by the inquiry terminal.

In the disclosure, the inquiry search server also receives the evaluation given by the inquiry terminal on an answer and updates the points of the target inquiry terminal giving the answer according to the scores of the evaluation.

The essence of the technical solution of the disclosure is further set forth below with reference to specific examples.

Example 1: Cell Service

When at home, the user of an inquiry terminal may need instant information on the surroundings, for example, the user desires for information on where commodities are sold at a favorable price, where a restaurant providing affordable food can be found or where a house for rent is available, but it is inconvenient to ask information from strangers around, then the user can record his/her question in an audio record or a video manner on his/her inquiry terminal and inputs a keyword 'nearby'. The user may receive a given number of voice answers from neighbors after a while, in this way, the user of the inquiry terminal obtains desired information. Meanwhile, the user of the inquiry terminal marks the quality of the answers to the inquiry request and submits the scores to the inquiry search server.

Example 2: Consult Professionals Such as a Math Teacher

Occasionally, the question from the user of the inquiry terminal needs to be answered by professionals, for instance, the user of the inquiry terminal may desire to consult some professional teachers on a difficult mathematical problem, in this case, the user may record the mathematical problem in an audio or a video manner on his/her inquiry terminal and input a keyword 'math teacher'. A given number of voice or video answers may be received from matched teachers after a while. Meanwhile, the user of the inquiry terminal may mark the quality of the audio or video answers received and submit the scores to the inquiry search server.

Example 3: An Effective Supplement to Siri

The siri voice system launched by Apple Inc, although capable of answering many questions, is yet helpless to complicated problems, in this situation, by means of the technical solution provided herein, a desired answer can be obtained by connecting a voice signal of the user of the inquiry terminal with the voice inquiry search server provided herein, and then, the user of the inquiry terminal can obtain a given number of voice answers. Meanwhile, the user of the inquiry terminal may mark the quality of the answers to the voice inquiry request and submit the scores to the voice inquiry search server.

Example 4: Advertisement Service

The user of the inquiry terminal provided herein may publish advertisement services on the system to, for example, promote the sale of a product or look for a lost pet, in this case, the user of the inquiry terminal may make an audio advertisement on his/her inquiry terminal and input a keyword 'nearby', and the people nearby receive the advertisement, however, there is a risk that this activity may be reported.

Example 5: Call Acquaintances

The user of the inquiry terminal provided herein may send a notification to a known group, and the inquiry terminal IDs of the members of the group are all stored in the inquiry terminal, then the user of the inquiry terminal may record a voice notification on his/her inquiry terminal and attach the inquiry terminal IDs of all the members in the group, in this way, the members of the group can receive the notification.

Figure 3:
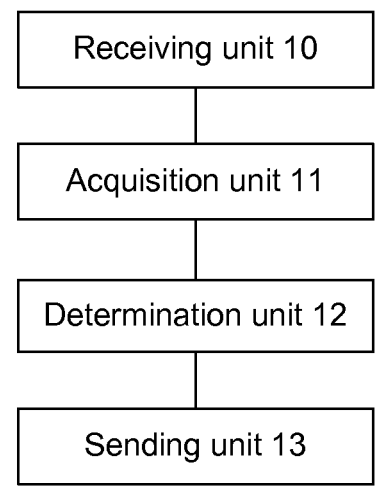
FIG. 3 is a schematic diagram illustrating the structure of an inquiry search server according to an embodiment of the disclosure.

FIG. 3 is a schematic diagram illustrating the structure of an inquiry search server according to an embodiment of the disclosure, and as shown in FIG. 1, the inquiry search server provided herein includes a receiving unit 10, an acquisition unit 11, a determination unit 12 and a sending unit 13, wherein the receiving unit 10 is configured to receive an inquiry request from an inquiry terminal user and an answer to the inquiry of the inquiry terminal user;

the acquisition unit 11 is configured to acquire a keyword of the inquiry request;

the determination unit 12 is configured to determine a given number of target inquiry terminals potentially capable of answering the inquiry of the inquiry terminal user as a target inquiry terminal group according to the keyword and relevant information of the other inquiry terminals; and the sending unit 13 is configured to send the inquiry request to the target inquiry terminal group.

The inquiry search server further may include:

a storage unit (not shown in FIG. 1) configured to store relevant information of the inquiry terminal, wherein the relevant information of the inquiry terminal which is all stored in the inquiry search server includes at least one of:

the personal information of the user of the inquiry terminal and the information updated by the inquiry terminal in real time, wherein the personal information of the user of the inquiry terminal includes at least one of:

the name, the gender, the age, the ID card number, the home address, the skilled field, the demand, and the wish of each family member of the user of the inquiry terminal, and the information updated by the inquiry terminal in real time includes at least one of:

geographical location information, the number of the target inquiry terminals required by the inquiry terminal to be included in the target inquiry terminal group, the number of the answers desired by the inquiry terminal, the idle/busy state of the receiving cache of the inquiry terminal and the points gotten by the inquiry terminal as a target inquiry terminal.

When the inquiry terminal initiates an inquiry request, the receiving unit 10 receives a notification indicative of the keyword of the inquiry request; and the acquisition unit 11 acquires the keyword of the inquiry request from the receiving unit 10.

Alternatively, the acquisition unit 10 analyzes the keyword of the inquiry request from the content of the inquiry request.

The determination unit 12 is also configured to match the keyword with the relevant information of each inquiry terminal user, preferentially with relevant information of an idle inquiry terminal and/or an inquiry terminal getting more points, and determine the final target inquiry terminal group based on the number of the target inquiry terminals required by the inquiry terminal.

When there is no inquiry terminal matching with the keyword or the number of the target inquiry terminals in the target inquiry terminal group fails to meet the requirement of the inquiry terminal, the inquiry terminal close to the home address and/or the current location of the user of the inquiry terminal is preferentially added into the target inquiry terminal group; or, when there is no inquiry terminal user matching with the keyword or the number of the target inquiry terminals in the target inquiry terminal group fails to meet the requirement of the inquiry terminal, the inquiry terminal getting more points is preferentially added into the target inquiry terminal group.

The inquiry search server further may include:

an update unit (not shown in FIG. 3) configured to update the points of the user of the target inquiry terminal answering the inquiry according to an evaluation given by the inquiry terminal on the answer after the evaluation is received by the receiving unit 10 and update the instant geographical location information of the user of the inquiry terminal.

It should be appreciated by those skilled in the art that the functions realized by each processing unit in the inquiry search server shown in FIG. 3 can be understood with reference to the description of the foregoing service transmission method based on global pre-coding. It also should be appreciated by those skilled in the art that the functions realized by each processing unit in the inquiry search server shown in FIG. 3 can be achieved by a program running on a processor or by a specific logic circuit.

Figure 4:
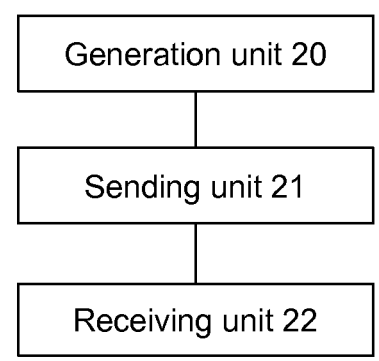
FIG. 4 is a schematic diagram illustrating the structure of an inquiry terminal according to an embodiment of the disclosure.

FIG. 4 is a schematic diagram illustrating the structure of an inquiry terminal according to an embodiment of the disclosure, and as shown in FIG. 4, the inquiry terminal provided herein includes a generation unit 20, a sending unit 21 and a receiving unit 22, wherein the generation unit 21 is configured to generate an inquiry request;

the sending unit 22 is configured to send the inquiry request to an inquiry search server; and the receiving unit 23 is configured to receive an answer to the inquiry request forwarded by the inquiry search server.

The sending unit 22 sends the inquiry request to the inquiry search server when the inquiry terminal is in an idle state.

The inquiry terminal further may include:

a storage unit (not shown in FIG. 4) configured to store an answer; and the sending unit 22 which is also configured to notify the inquiry search server of the occupied state of the storage unit.

It should be appreciated by those skilled in the art that the functions realized by each processing unit in the inquiry terminal shown in FIG. 4 can be understood with reference to the description of the foregoing service transmission method based on global pre-coding. It also should be appreciated by those skilled in the art that the functions realized by each processing unit in the inquiry terminal shown in FIG. 4 can be achieved by a program running on a processor or by a specific logic circuit.

The inquiry system provided herein includes the foregoing inquiry search server shown in FIG. 3 and the foregoing inquiry terminal shown in FIG. 4. Specific structures and functions of the inquiry search server and the inquiry terminal can be understood with reference to the description of the foregoing inquiry system and the foregoing inquiry method and are not described here repeatedly in detail.

The mentioned above is merely embodiments of the disclosure but is not to be construed as limitation to the protection scope of the disclosure.

INDUSTRIAL APPLICABILITY

In the disclosure, after receiving an inquiry request from an inquiry terminal, an inquiry search server acquires a keyword related to the inquiry request, determines a given number of other inquiry terminals potentially capable of answering the inquiry of the inquiry terminal as a target inquiry terminal group according to the keyword and relevant information of the other inquiry terminals, and sends the inquiry request to each target inquiry terminal in the target inquiry terminal group. The disclosure realizes a voice-level inquiry and the acquisition of a voice-level answer, thus undoubtedly facilitating the operation of the user of a voice inquiry terminal, and by making a voice record, the user of a voice inquiry terminal can initiate an inquiry or answer an inquiry, which is greatly beneficial to the promotion of the technical solution of the disclosure.

What is claimed is:

1. An inquiry method, comprising:
    acquiring, by an inquiry search server, a keyword related to an inquiry request after the inquiry search server receives the inquiry request from an inquiry terminal, determining a given number of other inquiry terminals as a target inquiry terminal group according to the keyword and relevant information of the other inquiry terminals, and sending the inquiry request to each target inquiry terminal in the target inquiry terminal group;
    wherein the determining a given number of other inquiry terminals as a target inquiry terminal group according to the keyword and relevant information of the other inquiry terminals refers to:
    matching the keyword with the relevant information of the other inquiry terminals, preferentially with an idle inquiry terminal and/or an inquiry terminal getting more points, and determining a final target inquiry terminal group based on the number of target inquiry terminals required by the inquiry terminal;
    when there is no inquiry terminal matching with the keyword or the number of the target inquiry terminals fails to meet the requirement of the inquiry terminal, adding an inquiry terminal close to a home address or a current location of the user of the inquiry terminal in the target inquiry terminal group;
    alternatively, when there is no inquiry terminal matching with the keyword or the number of the target inquiry terminals fails to meet the requirement of the inquiry terminal, preferentially adding the inquiry terminal getting more points in the target inquiry terminal group.

2. The method according to claim 1, further comprising:
    sending, by the inquiry search server, an answer to the inquiry after the inquiry search server receives the answer from a target inquiry terminal.

3. The method according to claim 2, further comprising:
    keeping the number of answers to the inquiry received by the inquiry search server and sent from the inquiry search server to the inquiry terminal not more than the number of answers that the inquiry terminal desires to acquire.

4. The method according to claim 3, further comprising:
    receiving, by the inquiry search server, an evaluation given by the inquiry terminal on an answer and updating points of a target inquiry terminal giving the answer according to scores of the evaluation.

5. The method according to claim 2, further comprising:
    receiving, by the inquiry search server, an evaluation given by the inquiry terminal on an answer and updating points of a target inquiry terminal giving the answer according to scores of the evaluation.

6. The method according to claim 2, further comprising:
    receiving, by the inquiry search server, an evaluation given by the inquiry terminal on an answer and updating points of a target inquiry terminal giving the answer according to scores of the evaluation.

7. The method according to claim 1, further comprising:
    storing all relevant information of the inquiry terminal in the inquiry search server, wherein the relevant information of the inquiry terminal comprises at least one of: personal information of a user of the inquiry terminal, and information updated by the inquiry terminal in real time,
    wherein the personal information of the user of the inquiry terminal comprises at least one of: a name, gender, age, an ID card number, a home address, a skilled field, a demand, and a wish of each family member of the user of the inquiry terminal, and
    wherein the information updated by the inquiry terminal in real time comprises at least one of: geographical location information, the number of target inquiry terminals required by the inquiry terminal in the target inquiry terminal group, the number of answers desired by the inquiry terminal, an idle/busy state of a receiving cache of the inquiry terminal and points gotten by the inquiry terminal as a target inquiry terminal.

8. The method according to claim 7, wherein the acquiring a keyword related to an inquiry request refers to:
    notifying, by the inquiry terminal, the inquiry search server of the keyword of the inquiry request when the inquiry terminal initiates the inquiry request;
    or analyzing, by the inquiry search server, the keyword of the inquiry request from content of the inquiry request received.

9. The method according to claim 8, further comprising:
    receiving, by the inquiry search server, an evaluation given by the inquiry terminal on an answer and updating points of a target inquiry terminal giving the answer according to scores of the evaluation.

10. The method according to claim 7, further comprising:
    assigning, by the inquiry search server, identification information to each inquiry terminal, and sending the inquiry request received to each target inquiry terminal in the target inquiry terminal group according to the identification information of the each inquiry terminal.

11. The method according to claim 10, further comprising:
receiving, by the inquiry search server, an evaluation given by the inquiry terminal on an answer and updating points of a target inquiry terminal giving the answer according to scores of the evaluation.

12. The method according to claim 7, further comprising:
receiving, by the inquiry search server, an evaluation given by the inquiry terminal on an answer and updating points of a target inquiry terminal giving the answer according to scores of the evaluation.

13. The method according to claim 1, further comprising:
receiving, by the inquiry search server, an evaluation given by the inquiry terminal on an answer and updating points of a target inquiry terminal giving the answer according to scores of the evaluation.

14. The method according to claim 13, wherein the inquiry request comprises a voice inquiry request, a video inquiry request and a text inquiry request; and
the answer to the inquiry request comprises a voice answer, a video answer and a text answer.

15. An inquiry search server, comprising:
a processor; and
a non-transitory memory for storing instructions executable by the processor;
wherein the non-transitory memory is configured to:
receive an inquiry request from an inquiry terminal;
acquire a keyword of the inquiry request;
determine a given number of other inquiry terminals as a target inquiry terminal group according to the keyword and relevant information of the other inquiry terminals,
match the keyword with the relevant information of each inquiry terminal, preferentially with relevant information of an idle inquiry terminal and/or an inquiry terminal getting more points, and determine a final target inquiry terminal group based on the number of target inquiry terminals required by the inquiry terminal, when there is no inquiry terminal matching with the keyword or the number of target inquiry terminals in the target inquiry terminal group fails to meet the requirement of the inquiry terminal, an inquiry terminal close to a home address and/or a current location of the user of the inquiry terminal is preferentially added into the target inquiry terminal group; or, when there is no inquiry terminal matching with the keyword or the number of the target inquiry terminals in the target inquiry terminal group fails to meet the requirement of the inquiry terminal, the inquiry terminal getting more points is preferentially added into the target inquiry terminal group; and
send the inquiry request to each inquiry terminal in the target inquiry terminal group.

16. The inquiry search server according to claim 15, further configured to store relevant information of each inquiry terminal, wherein the relevant information of the inquiry terminal comprises at least one of: personal information of a user of the inquiry terminal and information updated by the inquiry terminal in real time,
wherein the personal information of the user of the inquiry terminal comprises at least one of: a name, gender, age, an ID card number, a home address, a skilled field, a demand, and a wish of each family member of the user of the inquiry terminal, and
the information updated by the inquiry terminal in real time comprises at least one of: geographical location information, the number of inquiry terminals required by the inquiry terminal in the target inquiry terminal group, the number of answers desired by the inquiry terminal, an idle/busy state of a receiving cache of the inquiry terminal and points gotten by the inquiry terminal as a target inquiry terminal.

17. The inquiry search server according to claim 15, wherein when the inquiry terminal initiates the inquiry request, the non-transitory memory is further configured to receives a notification indicative of the keyword of the inquiry request, and acquire the keyword of the inquiry request or
analyze the keyword of the inquiry request from content of the inquiry request.

18. An inquiry system comprising the inquiry search server of claim 15 and an inquiry terminal which comprises a generation unit, a sending unit and a receiving unit, wherein
the generation unit is configured to generate an inquiry request;
the sending unit is configured to send the inquiry request to an inquiry search server; and
the receiving unit is configured to receive an answer, forwarded by the inquiry search server, to the inquiry request.

19. The inquiry system according to claim 18, wherein the inquiry search server further comprises a storage unit configured to store relevant information of each inquiry terminal, wherein the relevant information of the inquiry terminal comprises at least one of: personal information of a user of the inquiry terminal and information updated by the inquiry terminal in real time,
wherein the personal information of the user of the inquiry terminal comprises at least one of: a name, gender, age, an ID card number, a home address, a skilled field, a demand, and a wish of each family member of the user of the inquiry terminal, and
the information updated by the inquiry terminal in real time comprises at least one of: geographical location information, the number of inquiry terminals required by the inquiry terminal to be comprised in the target inquiry terminal group, the number of answers desired by the inquiry terminal, an idle/busy state of a receiving cache of the inquiry terminal and points gotten by the inquiry terminal as a target inquiry terminal.

20. The inquiry system according to claim 18, wherein when the inquiry terminal initiates the inquiry request, the receiving unit receives a notification indicative of the keyword of the inquiry request; and the acquisition unit acquires the keyword of the inquiry request from the receiving unit; alternatively, the acquisition unit analyzes the keyword of the inquiry request from content of the inquiry request.

21. The inquiry system according to claim 18, wherein the inquiry terminal further comprises a storage unit configured to store the answer;
wherein the sending unit is also configured to notify an idle/busy state of the storage unit to the inquiry search server.

* * * * *